June 7, 1955  J. B. REEVES  2,710,358
UNIDIRECTIONAL CURRENT POWER SUPPLY SYSTEMS
Filed May 8, 1952
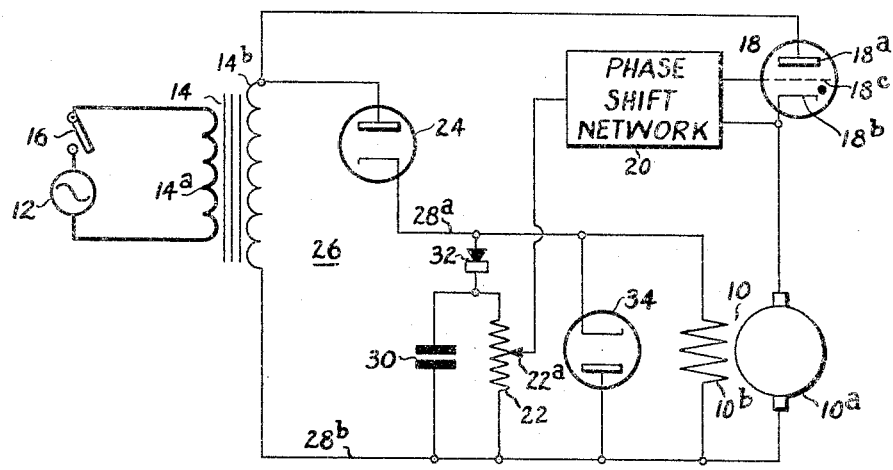

2,710,358

UNIDIRECTIONAL CURRENT POWER SUPPLY SYSTEMS

James B. Reeves, Whitefish Bay, Wis., assignor to Cutler-Hammer, Inc., Milwaukee, Wis., a corporation of Delaware Application May 8, 1952, Serial No. 286,757

5 Claims. (Cl. 307—155)

This invention relates to improvements in unidirectional current power supply systems. More particularly it relates to systems which are adapted to simultaneously supply unidirectional current to a plurality of load circuits from an alternating current source of supply.

When two or more load circuits are connected in parallel and supplied with pulsating unidirectional power from a single source, energy stored in any reactance in the load circuits during the periods of pulsating supply power maximums will be discharged during the periods of supply power minimums to cause circulating current to flow between the load circuits. If such circulating currents are permitted, one load circuit affects the amount of power supplied to another.

It is an object of this invention to provide an improved unidirectional current power supply system for the simultaneous supply of a plurality of load circuits, and It is a further object to provide a system of the aforementioned type in which one load circuit does not affect the amount of power supplied to another, and It is an additional object to provide such a system at a minimum manufacturing cost.

Various other objects and advantages of the invention will hereinafter appear.

The accompanying drawing is a diagrammatic showing of an embodiment of the invention in a motor control system which will now be described, it being understood that various modifications in the embodiment and of the load circuits employed may be made without departing from the spirit and scope of the appended claims.

Referring to the drawing, there is shown a control system for an electric motor 10 having an armature 10$^a$ and a field winding 10$^b$ each of which is supplied with pulsating unidirectional current derived from an alternating current source of supply 12. Supply of the system from the source 12 is afforded through the medium of a transformer 14 having a primary winding 14$^a$ and a secondary winding 14$^b$.

Upon closure of a switch 16, alternating current from source 12 energizes the primary winding 14$^a$, whereupon an alternating voltage is developed in secondary winding 14$^b$. The latter voltage is applied to armature 10$^a$ through a thyratron control tube 18 which has an anode 18$^a$, a cathode 18$^b$ and a control element 18$^c$. Current to armature 10$^a$, caused to flow by the voltage of secondary winding 14$^b$, is made unidirectional by the rectifying action of anode 18$^a$ and cathode 18$^b$ and is limited to an average value determined by a reference voltage applied to control element 18$^c$. The latter limiting action is well understood in the electronic art and is, therefore, not described in detail herein.

The reference voltage for control element 18$^c$ is applied through a phase shift network 20 and an adjustable tap 22$^a$ of a resistor 22 from a voltage impressed thereacross by a unidirectional current derived from secondary winding 14$^b$ and rectifier element 24.

The combination of secondary winding 14$^b$ and rectifier element 24 may be considered as a source, generally designated 26, of half wave rectified current having a pair of output conductors 28$^a$ and 28$^b$ across which are connected two load circuits, one comprising the parallel combination of resistor 22 and a filter capacitor 30 and having connection to terminal 28$^a$ through a rectifier element 32, and the other comprising the parallel combination of field winding 10$^b$ and back rectifier 34.

During the alternate half cycles of the voltage of secondary winding 14$^b$ when source 26 is operative to supply current to its loads, current flows from conductor 28$^a$ through rectifier element 32, and thence through resistor 22 and also into capacitor 30. During the intervening half cycles of the voltage of secondary winding 14$^b$, current flows out of capacitor 30 through resistor 22. Thus the current and voltage drop of resistor 22 and the reference voltage obtained therefrom are maintained substantially non-pulsating.

During the aforementioned alternate half cycles, source 26 also supplies pulsating unidirectional current to field winding 10$^b$. Back rectifier 34 has connection to offer high impedance to flow of current from source 26 but offers low impedance to back current developed by the inductance of field winding 10$^b$ during the aforementioned intervening half cycles.

Rectifier element 32 prevents the discharge current of capacitor 30 from flowing through the low resistance of back rectifier 34 but does permit charging current flow from source 26 to capacitor 30 and discharge of capacitor 30 through resistor 22.

Thus the inclusion of a rectifier element in the circuit to confine the energy stored in a load circuit containing reactance to dissipation within that load circuit makes possible the simultaneous supply of pulsating unidirectional current to two loads from a single source of supply without having one load affect the power supplied to the other despite the fact that the loads have different impedance and the impedance of one or both loads is reactive. It is apparent that my invention is also applicable where one load is purely resistive or where more than two loads, one or more of which include reactance, are supplied from a single source of unidirectional current.

I claim:

1. The combination of a unidirectional current power supply system energizable from an alternating current source of supply, a plurality of load circuits connected to be energized in parallel from said power supply system, one of said load circuits including reactance, and a half wave rectifying element having connection in series with and intermediate said one load circuit and one other of said load circuits to permit energization of said one and said one other load circuit and prevent flow of circulating current from said one load circuit to said other load circuit.

2. The combination of a unidirectional current power supply system energizable from an alternating current source of supply and having a pair of output conductors, a plurality of load circuits connected to be energized in parallel from said power supply system, one of said load circuits including reactance, and a half wave rectifying element having series connection with and intermediate said one load circuit and one of said conductors whereby flow of current to said one load circuit is permitted and energy stored in the reactance of said one load circuit is confined to be dissipated in said one load circuit.

3. The combination with a unidirectional current power supply system adapted to be energized from an alternating current source of supply, of at least two load circuits connected to be energized in parallel from said supply system, one of said load circuits comprising the parallel combination of a capacitive reactor and a resistance element, and a half wave rectifier element having connection with said one load circuit to permit flow of supply current to said one load circuit and to confine the discharge current of said capacitive reactor to flow in said one load circuit.

4. The combination with a unidirectional current power supply system adapted to be energized from an alternating current source of supply and comprising a half wave rectifier element and a pair of output conductors, of at least two load circuits connected to be energized in parallel from said conductors, one of said load circuits comprising the parallel combination of an inductive reactor and a back rectifier and the other of said load circuits comprising the parallel combination of a capacitive reactor and a resistor, and a half wave rectifier element series connected intermediate said other load circuit and one of said conductors and acting to confine the energy stored in said capacitive reactance to dissipation in said other load circuit.

5. The combination with a pulsating unidirectional current power supply system, of at least two load circuits connected to be energized in parallel from said power supply system, one of said load circuits including a reactive impedance element, and a half wave rectifying element having connection with said load circuit whereby flow of supply current to said one load circuit through said rectifying element is permitted and the energy stored in the reactive impedor of said one load circuit is confined to be dissipated in said one load circuit.

References Cited in the file of this patent

UNITED STATES PATENTS

| | | |
|---|---|---|
| 1,966,077 | Nyman | July 10, 1934 |
| 2,537,677 | Knauth et al. | Jan. 9, 1951 |
| 2,539,100 | Rado | Jan. 23, 1951 |

OTHER REFERENCES

"Electronic Motor and Welder Controls," G. M. Chute; McGraw-Hill, 1951, p. 229, Fig. 15c.